UNITED STATES PATENT OFFICE.

ERNST HASSENKAMP, OF ELBERFELD, PRUSSIA, GERMANY, ASSIGNOR, BY MESNE ASSIGNMENTS, TO EDWARD N. DICKERSON, JR., OF NEW YORK, N. Y.

PROCESS OF PRODUCING BLUE-RED COLORING-MATTER.

SPECIFICATION forming part of Letters Patent No. 381,471, dated April 17, 1888.

Application filed March 1, 1887. Serial No. 229,339. (Specimens.)

*To all whom it may concern:*

Be it known that I, ERNST HASSENKAMP, a subject of the Emperor of Germany, residing at Elberfeld, in the Empire of Germany, have invented a new and useful Improvement in the Manufacture of Dye-Stuffs or Coloring-Matters, of which the following is a specification.

My invention relates to the production of new bluish-red coloring-matters for dyeing by the action of the tetrazo compound of para-diamines on new alkylated derivates of naphthylamine sulpho-acids, obtained by heating the salts of naphthylamine sulpho-acids in the presence of alkalies with alkyl-chlorids-bromids-iodids, or other means, and which distinguish themselves from the dye-stuffs of the naphthylamine sulpho-acids not alkylated.

In carrying out my process practically I proceed as follows: One hundred kilos of the soda salt of naphthylamine sulpho-acids dissolved in five hundred liters water and a solution of fifty-five kilos of the soda salt of the methyl-sulphonic acid are heated for about ten hours in an autoclave to about 180 to 200° Celsius.

*Example I. Dye-stuffs from benzidine and methyl-naphthylamine monosulpho-acids.*—Fifty kilos benzidine sulphate are suspended in a finely-comminuted condition with fifty kilos muriatic acid of 21° Baumé, diazotized by an aqueous solution of 22.2 kilos of sodium nitrite. The solution of the tetrazo-diphenyl chloride is now slowly added to ninety kilos alkyl-naphthylamine-monosulpho-acid, (obtained as described above,) blowing the free mineral acid by the addition of acetate of sodium, and thereby obtaining a brown-red precipitation, which is transformed into alkali salt in the manner well known. The dye-stuff obtained in this way forms a brown-red powder, easily soluble in water, and differs very materially from the yellowish-red dye-stuff of the benzidine and the naphthylamine sulpho-acid not alkylated. With concentrated sulphuric acid the dye-stuff dissolves into a full blue color.

Silk, wool, and cotton are dyed without any mordant, yielding a very bluish-red, and the chemical formula is as follows:

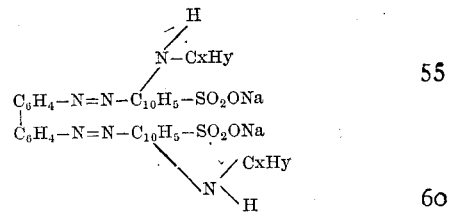

*Example II. Dye-stuff from tolidine and alkyl-naphthylamine sulpho-acid.*—By the action of tetrazo-ditolyl upon my new alkylated sulpho-acids a very fine bluish-red dye-stuff of a saffranine-like shade, fast to acid, is obtained. A solution of the muriatic tetrazo compound of fifty kilos tolidine is poured into a solution containing ninety kilos alkyl-naphthylamine sulpho-acid and one hundred and fifty kilos of acetate of soda. After heating the mixture and neutralizing with alkali, an azo-color forms, which, in an alkaline bath, dyes a splendid bluish-red of a saffranine-like shade on cotton not mordanted, being fast to diluted acids. Easily soluble in water, it shows in solution a full blue by the aid of concentrated sulphuric acid, and has this formula.

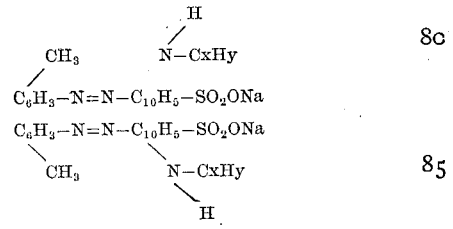

The salts of tetrazo-diphenyl or tetrazo-ditolyl may in every instance be replaced by salts of the tetrazo-diphenolethers, tetrazo-stilben, tetrazo-fluoren, tetrazo-diphenylenoxyd, or their sulphonic or carbonic acids.

What I claim as my invention, and desire to secure by Letters Patent, is—

The process for producing new bluish-red coloring-matters, which consists in combining salts of the tetrazo compound of paradiamines or their sulphonic or carbonic acids with the new alkyl-naphthylamine sulphonic acids, substantially as described.

ERNST HASSENKAMP.

Witnesses:
WM. A. POLLOCK,
H. COUTANT.